No. 697,882. Patented Apr. 15, 1902.
R. E. POINDEXTER.
SAW SET.
(Application filed Sept. 11, 1901.)
(No Model.)
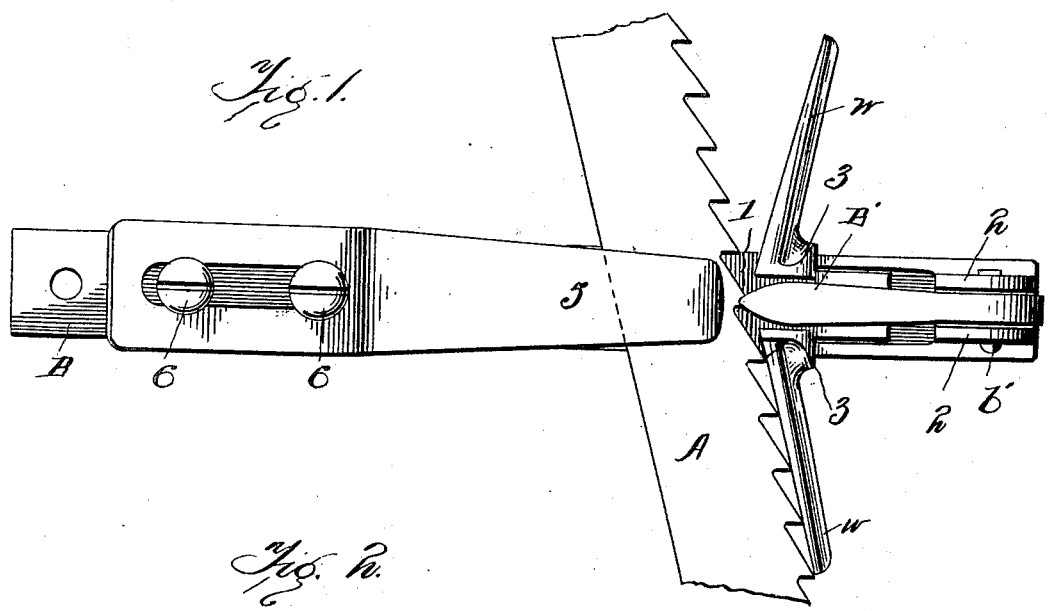
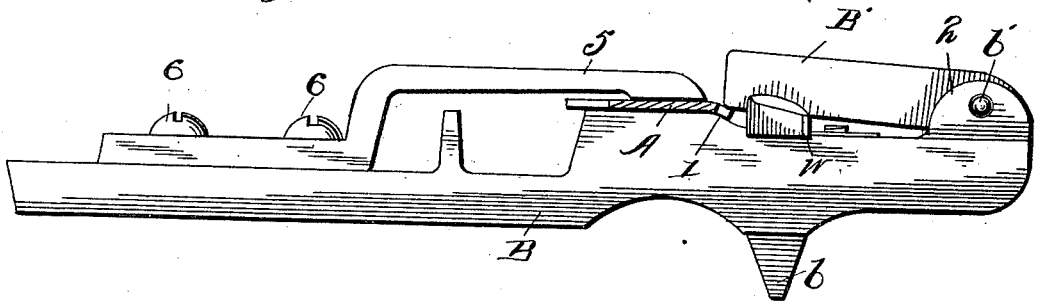
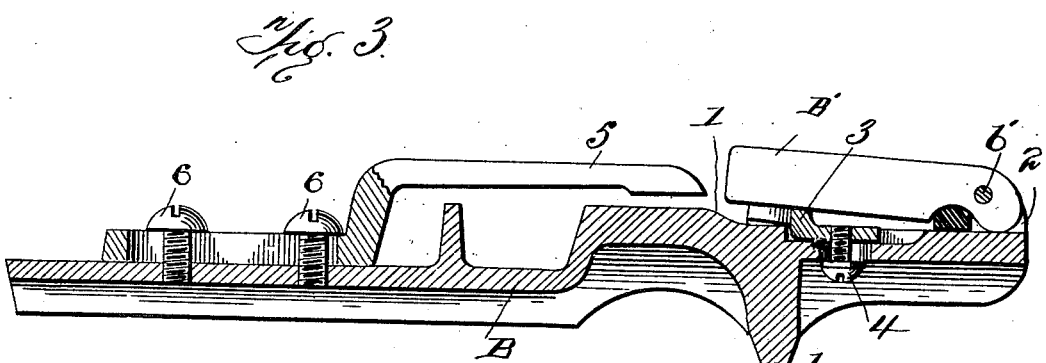
Witnesses
Chas. K. Davies.
Martin Keeling
Inventor
Robert E. Poindexter,
per E. W. Bradford
Attorney
THE NORRIS PETERS CO., PHOTO-LITHO., WASHINGTON, D. C.

UNITED STATES PATENT OFFICE.

ROBERT E. POINDEXTER, OF INDIANAPOLIS, INDIANA.

SAW-SET.

SPECIFICATION forming part of Letters Patent No. 697,882, dated April 15, 1902.

Application filed September 11, 1901. Serial No. 75,070. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Saw-Sets, of which the following is a specification.

My said invention consists in an improved construction and arrangement of parts of a saw-set designed especially to set saws the teeth whereof are formed to cut in one direction, such as band-saws, having the cutting edge of the tooth formed substantially square across the saw and its back at a long angle therewith to support the strain upon the tooth, whereby each tooth may be set at the proper angle with the direction of its cut without danger of bowing or springing the saw, as is often done by setting with the ordinary tools.

Referring to the accompanying drawings, which are made a part hereof, and on which similar reference characters indicate similar parts, Figure 1 is a top or plan view of one of my saw-sets, showing a saw therein in the position it occupies when being operated upon. Fig. 2 is a side elevation of the same, and Fig. 3 a longitudinal section.

In said drawings the portion marked A represents the saw, and B the block or base of the saw-set.

As above indicated, the saw A is a saw having the cutting edge and back of its teeth at different angles, such as band-saws and the like.

The base B of the saw-set is formed to be secured to a suitable support, as a block or bench, having a prong $b$, which may be driven into such support to secure the tool in place. An anvil 1 is formed on its top surface near its front end, and a die B', mounted on a pivot $b'$ between ears 2 at the front end of said base, is formed and adapted to coöperate with said anvil in setting the teeth, as will be presently described. A rest 3, having wings $w$ extending laterally and at an angle toward the pivoted end of die B', is mounted to be adjusted longitudinally in a way in the top of the base B, being secured by a clamping-screw 4, which extends through a slot in said base from the under side and engages with a screw-threaded perforation in said rest. Said wings $w$ serve as rests for the points of the teeth, and the adjustment thereof is to provide for large and small teeth, the rest being adjusted so that when the teeth bear against the surface of the appropriate wing $w$ just the proper proportion of their length will project over the apex of the anvil to secure the proper set. The angle of the wings $w$ is such that the angle of the teeth will be brought into proper relation to the anvil and die to receive the blow across the direction of its cutting edge, and thus secure the best results. A holding-finger 5 is clamped to the top of base B by screws 6 and is formed to extend over the saw and rest at its front end upon its surface during the operation of setting the teeth and holds the saw down flat, thus preventing buckling or springing.

In operation the rest 3 is adjusted to suit the size of the saw to be operated upon, as is also the presser-finger 5, so that said saw will be properly held and the teeth project the desired distance over the apex of the anvil and the parts clamped in these positions. The saw is then slid along with the points of its teeth bearing lightly against the appropriate face of the angle-wings $w$, and every other tooth is set by a blow upon the die B' in the well-known manner. The saw is then reversed, and with its teeth bearing against the other wing $w$ is run through the device, the remaining teeth being similarly operated upon. By this construction the teeth are given a set in their proper direction to their cutting edges, are not left with any back draft, and are given plenty of clearance, as required in sawing short turns and in other work for which band-saws are commonly employed.

By substituting a rest with surfaces at right angles with the edge of the anvil the same base may be used in setting saws of other characters, as will be readily understood.

Having thus fully described my said invention, what I claim, and desire to secure by Letters Patent, is—

1. In a saw-set the combination, of the base formed with the anvil, the die pivoted thereto to coöperate with said anvil, the adjustable rest 3 with wings extending out therefrom at angles with a line extending straight across the anvil, substantially as set forth.

2. In a saw-set, the combination of the base having the anvil thereon, a die pivoted thereto to coöperate with said anvil, and a rest for the edge of the saw having wings extending back obliquely from the central point of rest, substantially as described and for the purpose specified.

3. A saw-set comprising a base having an anvil, a die pivoted to coöperate with said anvil, and a rest for the edge of the saw extending back from said anvil at an oblique angle, whereby the tooth is supported at the desired angle to the setting-dies, substantially as set forth.

4. In a saw-set, the combination, of the base having an anvil near one end, a die pivoted to coöperate therewith, a rest for the edge of the saw, and a rest for the side of the saw opposite the anvil, and a presser-finger mounted on the top of the base to extend forward over said rest for the side of the saw-blade to near said anvil, whereby said saw-blade is embraced between said rest and said presser-finger except the extreme edge or teeth being operated upon, substantially as set forth.

5. In a saw-set, the combination, of the base with the anvil formed on its top, the die pivoted thereto to coöperate with said anvil, the rest for the edge of the saw mounted to be adjusted longitudinally of said base and formed with lateral wings extending back at an oblique angle, and the presser-finger, substantially as set forth.

In witness whereof I have hereunto set my hand and seal, at Indianapolis, Indiana, this 5th day of September, A. D. 1901.

ROBERT E. POINDEXTER. [L. S.]

Witnesses:
N. E. SMOCK,
D. K. HALL.